US009310181B2

(12) United States Patent
Xie et al.

(10) Patent No.: US 9,310,181 B2
(45) Date of Patent: Apr. 12, 2016

(54) ROCKING SENSOR DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Shaohua Xie, Beijing (CN); Zhi Hou, Beijing (CN); Daeoh Oh, Beijing (CN); Ziheng Yang, Beijing (CN); Eryuan Huang, Beijing (CN); Fan Yang, Beijing (CN); Mingming Wang, Beijing (CN); Jianwei Wang, Beijing (CN)

(73) Assignees: BOE Technology Group Co., Ltd. (CN); Hefei BOE Optoelectronics Technology Co., Ltd. (CN)

( * ) Notice: Subject to any disclaimer, the term of this patent is extended or adjusted under 35 U.S.C. 154(b) by 0 days.

(21) Appl. No.: 14/373,860

(22) PCT Filed: Sep. 19, 2013

(86) PCT No.: PCT/CN2013/083848
§ 371 (c)(1),
(2) Date: Jul. 22, 2014

(87) PCT Pub. No.: WO2014/173067
PCT Pub. Date: Oct. 30, 2014

(65) Prior Publication Data
US 2015/0300801 A1 Oct. 22, 2015

(30) Foreign Application Priority Data
Apr. 25, 2013 (CN) .......................... 2013 1 0148198

(51) Int. Cl.
*F16H 59/44* (2006.01)
*G01B 7/30* (2006.01)
(Continued)

(52) U.S. Cl.
CPC ................ *G01B 7/30* (2013.01); *B65G 49/064* (2013.01); *G01B 21/22* (2013.01); *G01V 3/08* (2013.01); *G01V 11/00* (2013.01)

(58) Field of Classification Search
CPC ......... A61H 7/007; A63C 17/24; G01D 5/12; G01D 5/14
USPC ............... 324/207.25, 207.2, 207.21, 207.24, 324/207.26, 207.15, 686, 750.17, 754.28, 324/658, 713, 327, 108–109; 702/47, 52
See application file for complete search history.

(56) References Cited

U.S. PATENT DOCUMENTS

| 5,730,467 A | * | 3/1998 | Huang | ................... | A63C 17/24 280/11.223 |
| 7,701,203 B2 | * | 4/2010 | Fouts | .................... | F16H 59/044 324/207.2 |
| 2007/0239089 A1 | * | 10/2007 | Chiu | ..................... | A61H 7/007 601/99 |

FOREIGN PATENT DOCUMENTS

CN          103246097 A          8/2013

OTHER PUBLICATIONS

PCT International Search Report for PCT/CN2013/083848, dated Feb. 20, 2014; 13 pages.
English Abstract of CN103246097A; 2 pages.
(Continued)

*Primary Examiner* — Patrick Assouad
*Assistant Examiner* — Taqi Nasir
(74) *Attorney, Agent, or Firm* — Banner & Witcoff, Ltd.

(57) ABSTRACT

A rocking sensor device includes a primary bracket (1), a rotating shaft (2), rollers (3), magnets (4) and a magnetic induction sensor (5). The primary bracket (1) is rockably connected to the rotating shaft (2). The rollers (3) and the magnets (4) are mounted on both ends of the primary bracket (1) and their positions are symmetrical about the rotating shaft (2). The magnetic induction sensor (5) is mounted on the perimeter of the primary bracket (1) at a position such that it can sense rocking of the magnet (4) on any end with the primary bracket (1). The rocking sensor device is wear and corrosion resistant, and can be self-cleaning.

20 Claims, 4 Drawing Sheets

(51) Int. Cl.
*B65G 49/06* (2006.01)
*G01B 21/22* (2006.01)
*G01V 3/08* (2006.01)
*G01V 11/00* (2006.01)

(56) References Cited

OTHER PUBLICATIONS

Oct. 27, 2015—International Preliminary Report on Patentability Appn PCT/CN2013/083848.

* cited by examiner

_US 9,310,181 B2_

ROCKING SENSOR DEVICE

CROSS REFERENCE TO RELATED APPLICATIONS

This application is based on International Application No. PCT/CN2013/083848 filed on Sep. 19, 2013, which claims priority to Chinese National Application No. 201310148198.3 filed on Apr. 25, 2013. The entire contents of each and every foregoing application are incorporated herein by reference.

TECHNICAL FIELD

Embodiments of the present invention relate to a rocking sensor device.

BACKGROUND

With the establishment of thin film transistor-liquid crystal display (TFT-LCD) technology in the 1990s, liquid crystal panels develops quickly due to advantages, such as flat plate, light weight, thin thickness, low power consumption, diversity and environment friendly characteristics. With the maximization of liquid crystal panels, in order to ensure products' quality, requirements on the precision of the needed equipments become higher and higher and demand for reliability of equipments during the production increases further.

In the manufacturing process flow of liquid crystal panels, processes that need non-aqueous liquid as reaction medium include important core processes such as rinsing, developing, etching and stripping off. In equipments used in these core technical processes, sensor devices, as important devices for sensing presence of glass substrates and transferring information on glass substrates, have played an important role. While rocking sensor devices have been widely used in the liquid crystal panel manufacturing equipments as important devices for sensing presence of glass during equipment liquor reaction intervals.

FIG. 1 is a structure of a rocking sensor device used in common conventional equipments. As shown in FIG. 1, the primary bracket 1 of the structure is provided with a roller 3 on its one end and a magnet 4 on the other end. The primary bracket 1 can rock around the rotating shaft 2. The device is provided with a magnetic induction sensor 5 under the magnet 4. During operation of the rocking sensor device, if there is no glass substrate over it, the primary bracket 1 is in the upright state and the magnet 4 at the lower end of the primary bracket is closest to the magnetic induction sensor 5. When there is a glass substrate over it, the glass substrate contacts the roller 3 to make the primary bracket 1 to rock into a certain angle, and the magnet 4 on the primary bracket 1 will deviate from the magnetic induction sensor 5 to a position. The magnetic induction sensor 5 would sense the rocking of magnet 4 with the primary bracket, and thereby sense the presence of the glass substrate. The rocking sensor devices used in conventional equipments present following problems. The primary bracket of the rocking sensor device has a roller at one end and an induction sensor at the other end. During use, the primary bracket rocking is not sensitive due to corrosions and wearing of the primary bracket and the rotating shaft, and it often deviates from normal position for 180 degrees, namely an instance in which the magnet is vertical upward and the roller is vertical downward, so that the magnetic induction sensor can not sense the rocking of the primary bracket, hence leading to an equipment failure.

SUMMARY

Embodiments of the present invention provide a rocking sensor device with good stability and can work when the primary bracket deviate from the normal position.

Embodiments of the present invention provide a rocking sensor device, which comprises a primary bracket, a rotating shaft, rollers, magnets and a magnetic induction sensor. The primary bracket is rockably connected to the rotating shaft. The rollers and the magnets are mounted on both ends of the primary bracket and their positions are symmetrical about the rotating shaft, and the magnetic induction sensor is mounted on the perimeter of the primary bracket at a position such that it can sense the rocking of the magnet on any end with the primary bracket.

In an example, the device further includes a secondary bracket perpendicularly connected with the rotating shaft. The magnetic induction sensor is mounted on the secondary bracket.

In an example, the magnetic induction sensor is mounted on the secondary bracket, and when the primary bracket is parallel with the secondary bracket, the magnetic induction sensor is positioned oppositely to the magnet on the primary bracket at proximate end.

As a preference of the above-mentioned technical solution, the primary bracket having two sides with respect to the rotating shaft have different weights, or only rollers at both ends of the primary bracket have different weights.

In an example, the primary bracket and the rotating shaft are connected by a bearing.

In an example, the bearing is provided with an air inlet protective cover and an air outlet protective cover at two ends respectively.

In an example, the air inlet protective cover comprises an air inlet tube and a cover body, the cover body comprises a chamber formed by two concentrical cylinders with one end sealed, in which an inner cylinder is hollow and a ring like air uniformization sheet with holes is provided in the chamber, and the air inlet tube communicates between the sealed end of the cover body and the air uniformization sheet.

In an example, the air outlet protection cover is a circular cup shape with holes at a bottom.

In an example, the air inlet protective cover and the air outlet protective cover are connected together.

BRIEF DESCRIPTION OF THE DRAWINGS

Embodiments of the present invention will be described in more detail below with reference to the accompanying drawings to allow one of ordinary skill in the art to understand the present invention more clearly, in which.

DETAILED DESCRIPTION OF THE PREFERRED EMBODIMENTS

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments and variants can be obtained by those of ordinary skill in the art without creative labor and those embodiments and variants shall fall into the protection scope of the present invention.

Unless otherwise defined, all the technical and scientific terms used herein have the same meanings as commonly understood by one of ordinary skill in the art to which the present invention belongs. The terms, such as "first," "second" or the like, which are used in the description and the claims of the present application, are not intended to indicate any sequence, amount or importance, but for distinguishing various components. Also, the terms, such as "a/an," "one," "the/said" or the like, are not intended to limit the amount, but for indicating the existence of at lease one. The terms, such as "comprise/comprising," "include/including" or the like, are intended to specify that the elements or the objects stated before these terms encompass the elements or the objects and equivalents thereof listed after these terms, but not preclude other elements or objects. The terms, such as "connect/connecting/connected," or the like, are not intended to define a physical connection or mechanical connection, but may include an electrical connection/coupling, directly or indirectly. The terms, such as "On," "under," "left," "right" or the like, are only used to indicate relative position relationship, and when the position of the object which is described is changed, the relative position relationship may be changed accordingly.

Figure 1:
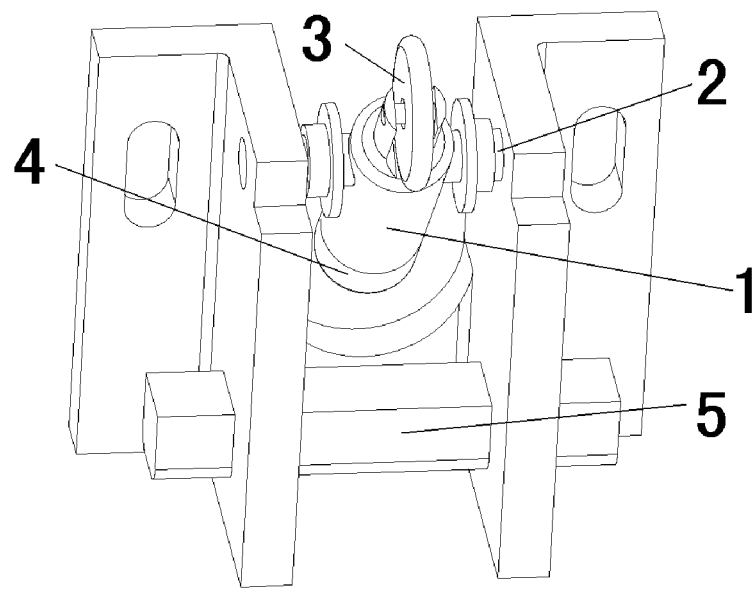
FIG. 1 is a schematic structural view of a conventional rocking sensor device.
Figure 2:
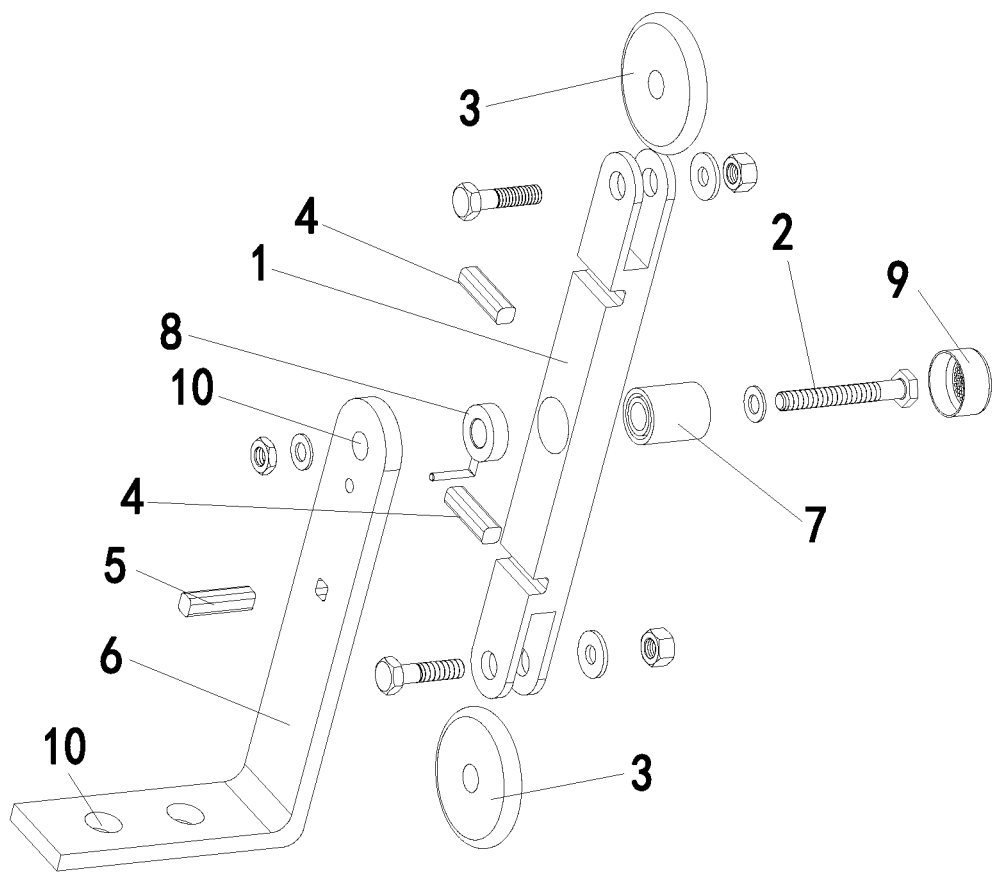
FIG. 2 is an exploded view of structure of a rocking sensor device according to an embodiment of the present invention.
Figure 3:
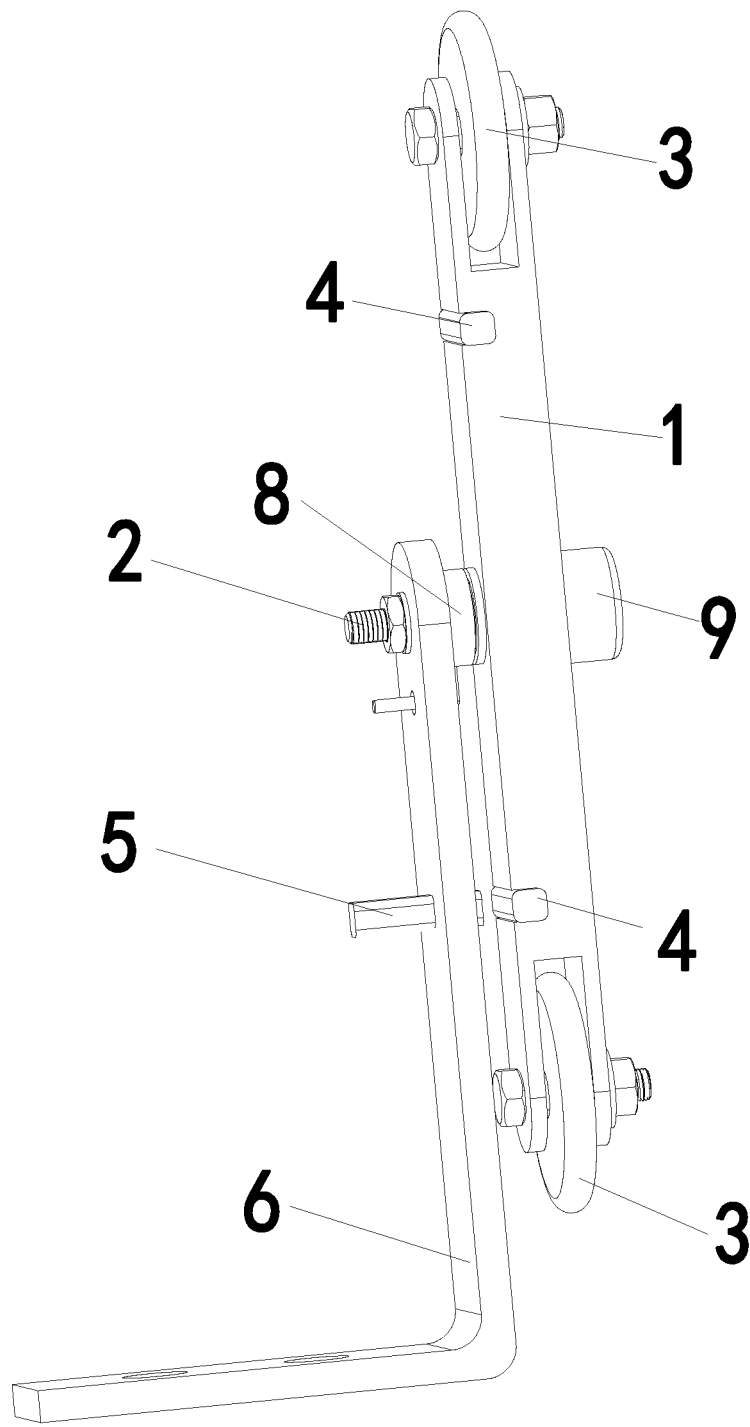
FIG. 3 is an assembly drawing of structure of a rocking sensor device according to an embodiment of the present invention.

As shown in FIGS. 2 and 3, the rocking sensor device provided in the present invention may include a primary bracket 1, a rotating shaft 2, a roller 3, a magnet 4 and a magnetic induction sensor 5. The primary bracket 1 is rockably connected to the rotating shaft 2. The primary bracket 1 is provided with rollers 3 and magnets 4 at both ends and they are symmetrical about the rotating shaft 2. The magnetic induction sensor 5 is mounted at a position on the perimeter of the primary bracket 1 such that it can sense the rocking of magnet 4 at either end with the primary bracket 1. By symmetrically disposing rollers 3 and magnets 4 on both ends of the primary bracket 1, the device enables positions of magnets 4 on both ends to exchange when the primary bracket 1 deviates from the normal position for 180 degrees, and the magnetic induction sensor 5 can keep working by sensing the magnet 4 on the other end.

The device may further include a secondary bracket 6 connected vertically to the rotating shaft 2 for fixing the rotating shaft 2 horizontally. The magnetic induction sensor 5 may be mounted on the secondary bracket 6 at a position such that it can sense the rocking of magnet 4 at either end with the primary bracket 1. When the primary bracket 1 is parallel with the secondary bracket 6, the magnetic induction sensor 5 mounted on the secondary bracket 6 is in an opposite position to that of the magnet 4 on the primary bracket at proximate end, the sensing effect of the magnetic induction sensor 5 is ideal and subjected to less disturbance from the magnet 4 at the other end. However, the present invention is not limited to this position. For example, the magnetic induction sensor 5 can also function to sense at other sensible positions.

It is possible to endow two sides of the primary bracket 1 with respect to the rotating shaft 2 with different weights, such that one end of the primary bracket 1 will naturally be vertically downward without any external force. It is also possible to endow the rollers 3 on both ends of the primary bracket 1 with different weights, such that the same effect as above can be realized.

Figure 4:
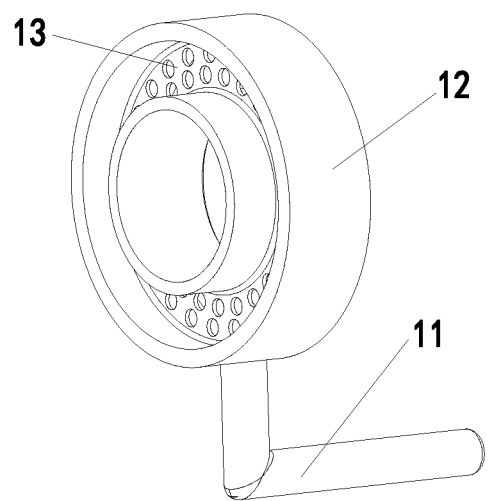
FIG. 4 is a inward viewed structure view of an air inlet protective cover of the rocking sensor device according to an embodiment of the present invention.
Figure 5:
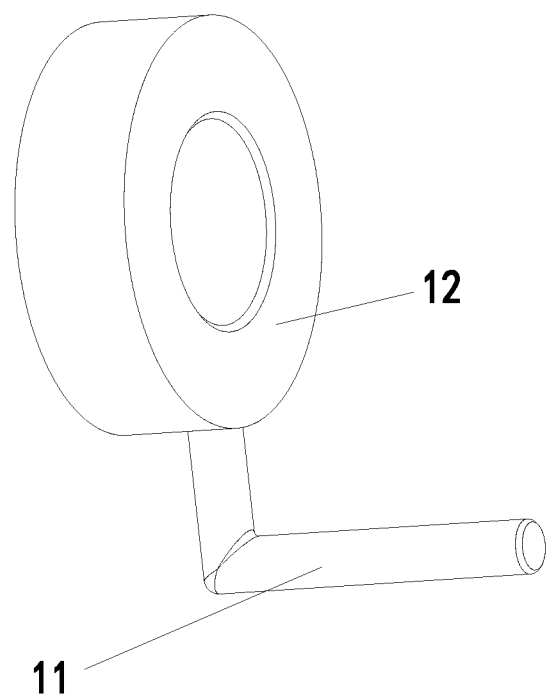
FIG. 5 is a outward viewed structure diagram of an air inlet protective cover of the rocking sensor device according to an embodiment of the present invention.
Figure 6:
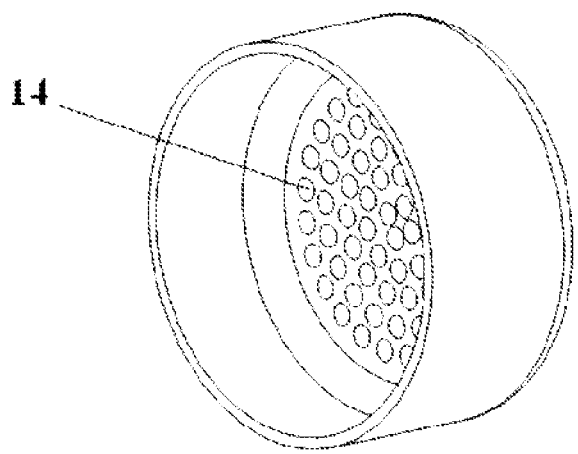
FIG. 6 is a structure diagram of a gas outlet protective cover of the rocking sensor device according to the present invention.
Figure 7:
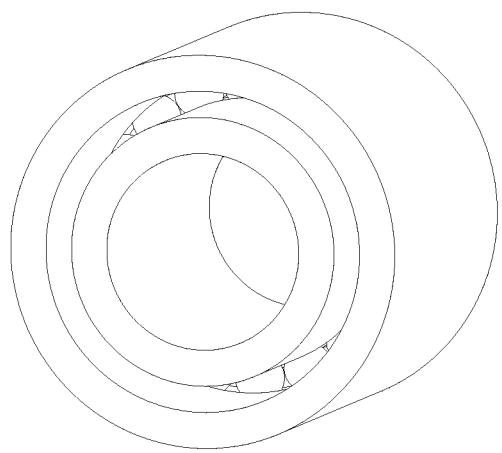
FIG. 7 is a structure diagram of a bearing of the rocking sensor device of the present invention.
Figure 8:
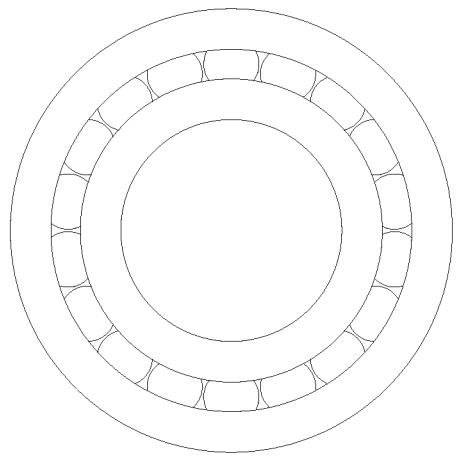
FIG. 8 is a front view of a bearing of the rocking sensor device of the present invention.

The primary bracket 1 and the rotating shaft 2 may be connected by the bearing 7 such that the primary bracket 1 rocks more sensitively and wearing between the rotating shaft 2 and the primary bracket 1 can be reduced. The structure of the bearing is shown in FIGS. 7 and 8. The bearing 7 may be provided with an air inlet protective cover 8 and an air outlet protective cover 9 at two ends respectively. As shown in FIGS. 4 and 5, the air inlet protective cover 8 may include an air inlet tube 11 and a cover body 12. The cover body 12 includes a chamber formed by two concentrically cylinders with one end sealed, in which the inner cylinder is hollow and a ring like air uniformization/distribution sheet 13 with holes is provided in the chamber. The air inlet tube 11 communicates between the sealed end of the cover body 12 and the air uniformization sheet 13. As shown in FIG. 6, the air outlet protective cover 9 may be of circular cup shape with hole at bottom. The air inlet protective cover 8 and the air outlet protective cover 9 are fitted together and may also connected as a whole to form together the protection space of the bearing 7. It is possible to introduce clean air into the protection space through the air inlet tube 11 of the air inlet protective cover 8, which can not only maintain clean operating environment of the bearing 7, but also can blow away debris produced when the primary bracket 1 is rocking.

In one embodiment of the present invention, as shown in FIGS. 2 and 3, the sensor device includes a primary bracket 1, a secondary bracket 6, a rotating shaft 2, rollers 3, magnets 4, a magnetic induction sensor 5, a bearing 7, an air inlet protective cover 8 and an air outlet protective cover 9. The primary bracket 1 is rockably connected to the rotating shaft 2 by the bearing 7. The primary bracket 1 is provided with a roller 3 and a magnet 4 at both ends and they are symmetrical about the rotating shaft 2, but rollers 3 on the two ends of the primary bracket 1 may be different.

The secondary bracket 6 is a metal plate of L-shape with its lateral plate provided with a mounting hole 10 for mounting the rocking sensor device and the vertical plate perpendicular to the lateral plate provided with a mounting hole 10 for connecting with the rotating shaft 2 and a magnetic induction sensor 5. The secondary bracket 6 is perpendicularly fixed and connected to the rotating shaft 2 by fasteners, such as nuts, such that the vertical plate of the secondary bracket 6 is parallel with the plane formed by rocking of the primary bracket. The magnetic induction sensor 5 is mounted on the secondary bracket 6. When the primary bracket 1 is parallel with the vertical plate of the secondary bracket 6, the magnetic induction sensor 5 is positioned oppositely to the magnet 4, that is, when the primary bracket 1 is vertically downward, the magnetic induction sensor 5 is in a position opposite to that of the magnet 4 at lower end. When the primary bracket 1 is vertically downward in a position parallel with the vertical plate of the secondary bracket 6, the magnetic induction sensor 5 can sense the magnet 4 on the primary bracket 1.

The bearing 7 is provided with an air inlet protective cover 8 and an air outlet protective cover 9 at two ends respectively. The air inlet protective cover 8 includes an air inlet tube 11 and a cover body 12. The cover body 12 includes a chamber formed by two concentrical cylinders with one end sealed, in which the inner cylinder is hollow to facilitate the rotating shaft to pass therethrough, and a ring like air uniformization sheet 13 with holes is provided in the chamber. The air inlet tube 11 communicates between the sealed end of the cover body 12 and the air uniformization sheet 13. The air outlet protective cover 9 is a circular cup shape with holes 14 at the bottom. The air inlet protective cover 8 and the air outlet protective cover 9 are fitted to form together the protection space for the bearing 7.

In the rocking sensor device of the present embodiment, when there is no substrate (such as glass substrate, quartz substrate and plastic substrate) over the primary bracket 1, since rollers 3 have different weights, the primary bracket 1 is naturally vertically downward and parallel with the secondary bracket 6. At this time, the magnetic induction sensor 5 on the secondary bracket 6 can sense the magnet 4 on the primary bracket 1. When there is a substrate over the primary bracket 1, the glass would press against the roller 3 over the primary bracket to make the primary bracket 1 and the secondary bracket 6 to form a certain angle. The magnetic induction sensor 5 on the secondary bracket 6 can sense the rocking of magnet 4 on the primary bracket 1 with the primary bracket, and thereby sense the presence of the substrate. At the same time, since the primary bracket 1 is provided with symmetrical disposed rollers 3 and magnets 4 on the two ends, when the primary bracket 1 deviates from the normal position for 180 degrees, the magnetic induction sensor 5 on the secondary bracket 6 can also sense the presence of substrate by sensing rocking of the magnet 4.

In order to keep the operating environment of the bearing 7 clean, it is possible to introduce clean air into the protection space through the air inlet tube 11 of the air inlet protective cover 8, which can not only keep the operating environment of the bearing 7 clean, but also blow away debris produced when the primary bracket 1 is rocking.

By providing rollers and magnets at both ends of the primary bracket at the same time, the rocking sensor device according to embodiments of the present invention enables the primary bracket to keep working normally when it deviates from the normal position for 180 degrees. The primary bracket and the rotating shaft are connected by a bearing, which makes the rocking of the primary bracket more sensitive and reduces the wear of the primary bracket and the rotating shaft. Protection covers are mounted at the two ends of the bearing to keep the bearing in a dry, pollution-free and clean operation state and make it resistive to corrosion. Therefore, the rocking sensor device according to embodiments of the present invention realizes effects of resistance to wear and corrosion, and self-cleaning.

The above implementations are only illustrative embodiments of the present invention rather than for limiting the present invention. Those of ordinary skill in the art can easily make various changes and variations without departing from the spirit and scope of the present invention. Therefore, all these changes and variations as well as equivalents should fall within the scope of the present invention.

What is claimed is:

1. A rocking sensor device comprising a primary bracket, a rotating shaft, rollers, magnets, and a magnetic induction sensor, wherein the primary bracket is rockably connected to the rotating shaft, wherein a first roller and a first magnet are mounted on a proximate end of the primary bracket and a second roller and a second magnet are mounted on a distal end of the primary bracket, wherein the rollers are symmetrical about the rotating shaft and the magnets are symmetrical about the rotating shaft, and wherein the magnetic induction sensor is mounted external to the primary bracket at a position such that the magnetic induction sensor senses rocking of the first magnet or the second magnet.

2. The rocking sensor device according to claim 1, further comprising a secondary bracket perpendicularly connected with the rotating shaft, wherein the magnetic induction sensor is mounted on the secondary bracket.

3. The rocking sensor device according to claim 2, wherein when the primary bracket is parallel with the secondary bracket, the magnetic induction sensor is disposed in a position opposite from that of the first magnet on the proximate end.

4. The rocking sensor device according to claim 3, wherein the proximal end comprises a different weight than the distal end.

5. The rocking sensor device according to claim 4, wherein said primary bracket and said rotating shaft are connected by a bearing.

6. The rocking sensor device according to claim 5, wherein said bearing is provided with an air inlet protective cover and an air outlet protective cover at two ends respectively.

7. The rocking sensor device according to claim 6, wherein said air inlet protective cover comprises an air inlet tube and a cover body.

8. The rocking sensor device according to claim 7, wherein said cover body comprises a chamber formed by two concentrical cylinders with one end sealed, in which an inner cylinder is hollow, and a ring-like air uniformization sheet with holes is provided in the chamber, and said air inlet tube communicates between the sealed end of said cover body and the air uniformization sheet.

9. The rocking sensor device according to claim 8, wherein the air outlet protective cover is a circular cup shape with holes at a bottom.

10. The rocking sensor device according to claim 9, wherein said air inlet protective cover and said air outlet protective cover are connected together.

11. The rocking sensor device according to claim 1, wherein the proximal end comprises a weight different from a weight of the distal end.

12. The rocking sensor device according to claim 2, wherein the first roller has a first weight and the second roller has a second weight different from the first weight.

13. The rocking sensor device according to claim 12, wherein said primary bracket and said rotating shaft are connected by a bearing.

14. The rocking sensor device according to claim 13, wherein said bearing is provided with an air inlet protective cover and an air outlet protective cover at two ends respectively.

15. The rocking sensor device according to claim 14, wherein said air inlet protective cover comprises an air inlet tube and a cover body.

16. The rocking sensor device according to claim 15, wherein said cover body comprises a chamber formed by two concentrical cylinders with one end sealed, in which an inner cylinder is hollow, and a ring-like air uniformization sheet with holes is provided in the chamber, and said air inlet tube communicates between the sealed end of said cover body and the air uniformization sheet.

17. The rocking sensor device according to claim 6, wherein the air outlet protective cover is a circular cup shape with holes at a bottom.

18. The rocking sensor device according to claim 7, wherein the air outlet protective cover is a circular cup shape with holes at a bottom.

19. The rocking sensor device according to claim 17, wherein said air inlet protective cover and said air outlet protective cover are connected together.

20. The rocking sensor device according to claim 18, wherein said air inlet protective cover and said air outlet protective cover are connected together.

\* \* \* \* \*